United States Patent [19]

Miyata et al.

[11] 3,927,991

[45] Dec. 23, 1975

[54] WEAR-RESISTANT SLIDING MEMBER

[75] Inventors: Jun Miyata; Toshihumi Morimoto, both of Hiroshima; Hiroshi Yamazoe, Yokohama, all of Japan

[73] Assignees: Toyo Kogyo Co., Ltd.; Nippon Carbon Co. Ltd., both of Japan

[22] Filed: Nov. 20, 1972

[21] Appl. No.: 308,276

Related U.S. Application Data

[63] Continuation of Ser. No. 53,569, July 9, 1970, abandoned.

[30] Foreign Application Priority Data

July 15, 1969  Japan.......................... 44-56278

[52] U.S. Cl. .............................................. 29/191.2
[51] Int. Cl.² ......................................... B32B 15/20
[58] Field of Search ........ 29/192, 192 CP; 117/228, 117/114 C; 277/235 R; 75/138

[56] References Cited
UNITED STATES PATENTS

| | | | |
|---|---|---|---|
| 2,996,412 | 8/1961 | Alexander...................... | 117/228 X |
| 3,239,319 | 3/1966 | Pollard................................. | 29/183 |
| 3,384,463 | 5/1968 | Olstowski et.al. .................... | 29/180 |
| 3,600,163 | 8/1971 | Badia et al............................ | 75/135 |
| 3,619,430 | 11/1971 | Hiratsuka et al. .................... | 264/29 |
| 3,758,298 | 9/1973 | Eppich................................. | 75/138 |

FOREIGN PATENTS OR APPLICATIONS

789,017  1/1958  United Kingdom................. 117/228

*Primary Examiner*—R. Dean
*Assistant Examiner*—O. F. Crutchfield
*Attorney, Agent, or Firm*—Bucknam and Archer

[57] ABSTRACT

A wear-resistant sliding member and more particularly an apex seal member for a rotary piston engine wherein the individual carbon articles are dispersed in, and bonded together with, a metal selected from aluminium and an aluminium alloy, with aluminium carbide produced at the interfaces between the particulate carbon and the metal. Preferably, the sliding member should contain 40–80% by volume of carbon and, if intended to be used as an apex seal member for a rotary piston engine, should contain 60 – 65% by volume of carbon and an aluminium alloy having a content of 11.0 – 13.0% by weight of silicon.

3 Claims, 7 Drawing Figures

WEAR-RESISTANT SLIDING MEMBER

This is a continuation of application Ser. No. 53,569, filed July 9, 1970, now abandoned.

This invention relates to an improved wear-resistant sliding member and, more particularly, to an apex seal member for a rotary piston engine.

The apex seal members of a rotary piston engine are mounted on the piston apexes so as to make planetary rotating motion with the piston while being kept in sliding contact with the inner surface of the engine casing by a joint action of the elastic force of the spring, gas pressure in the operating chamber and centrifugal force produced concomitantly with the rotation of the piston. It is, therefore, required of such seal member to have excellent mechanical properties as well as high wear and heat resistance. It is also a "must" that no abnormal wear is produced on the inner surface of the casing. In order to meet such requirements, various types of members comprising a carbon block or piece impregnated with a non-ferrous metal have been proposed. We have already developed or invented a most effective member by impregnating a carbon block or piece with aluminium or aluminium alloy and this invention has already been applied for patent in U.S. application Ser. No. 754,370/1968, and now abandoned.

However, these prior art devices involved some difficult problems in practical use. For instance, there was certain limitation in mechanical strength of the carbon block or piece before impregnation with metal, and there also existed unsurmountable limitation in the extent of possible improvements of the properties for best utilization as an apex seal member, with the result that the obtained apex seal member would be unsatisfactory in quality stability and in durability. Conventionally, the carbon blocks or pieces have been prepared in the following process: drying, calcinating and pulverizing amorphous carbon material such as coal or coke, adding thereto an organic bonding material such as coal tar pitch and kneading the mixture, then subjecting same to rollers to effect finer pulverization, compressing the pulverized material to shape a mass, and then subjecting same to primary and secondary heat treatments for a duration of several tens of days at a temperature of 800° to 1500°C. The carbon blocks or pieces thus obtained would have unevenness in their quality due to impossibility of uniform kneading of the bonding material, and also, since uniform impregnation of metal could hardly be achieved due to variation in configuration, size and distribution of pores after heat treatment, the resultant products were inevitably accompanied with unevenness in quality and poor mechanical properties, both macroscopically and microscopically. Further, should lubrication on the sliding face of the obtained apex seal member be insufficient, the carbon particles at the sections of poor coherence would produce "pitting" or "flaking" due to surface fatigue, thus giving rise to the so-called "decayed spots" on the surface, resulting in reduction of sealing performance of the apex seal member.

The present invention was devised with a view to giving a solution to such problems. According to the present invention, there is provided a novel and improved material in which the individual carbon particles are strongly bonded together by incorporation of aluminium or aluminium alloy which serves to produce aluminium carbide ($Al_4C_3$) between the carbon particles and said metal and where, structurally, the carbon particles are uniformly dispersed in abundance in the aluminium or aluminium alloy base, thereby realizing remarkable improvements in the properties of the wear-resistant sliding members such as apex seal members that can be produced from such novel material.

Now, the method of produciing a wear-resistant sliding member according to the present invention will be discussed in detail with reference to the accompanying drawings. The discussion that follows will be concentrated on the particular case where said wear-resistant sliding member is used as an apex seal member for a rotary piston engine for simplicity and better understanding of the present invention. In the drawings.

Figure 1:
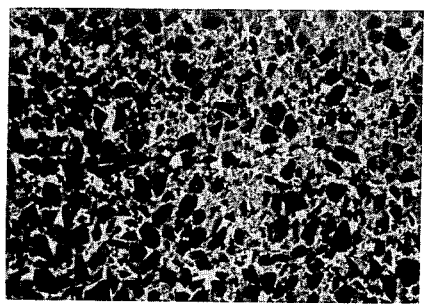
FIGS. 1 to 4 are the 100 times-magnified microphotographs showing the structures of the wear-resistant sliding members as they are used as the apex seal members produced in the 1st to 4th Examples of the present invention.
Figure 2:
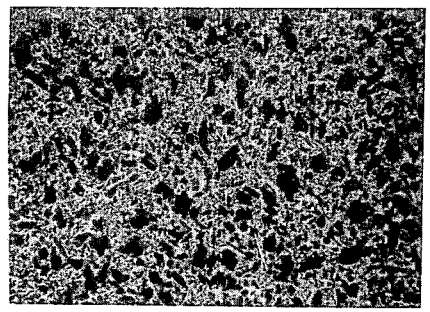
Figure 3:
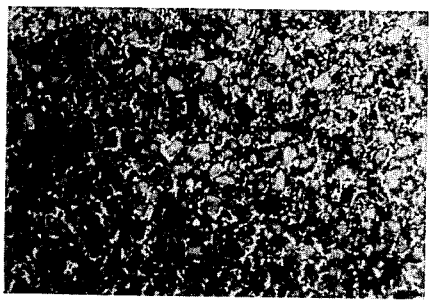
Figure 4:
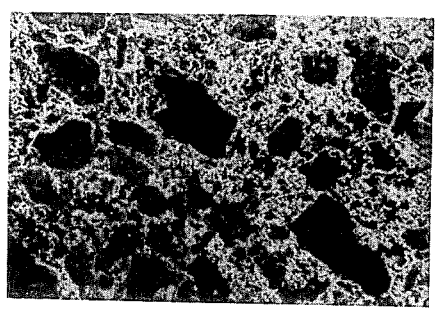

The carbon material for the apex seal member may be suitably obtained from anthracite, coke, caking coal or graft-polymerized coke which was calcinated at more than 800°C. Such material is pulverized and then subjected to grain size adjustment to obtain desired clean carbon powder. It is to be noted that calcinated anthracite or coke proves helpful to improve mechanical strengths of the apex seal member, while caking coal or graft-polymerized coke is useful to better thermal deformation resistance of said member. The carbon powder is packed in a packing vessel made of sheet metal such as aluminium by tapping, pressing or other suitable means in such a manner as to allow communication of air in the inside and outside of the vessel, and then said vessel is suspended with wire ropes or other means into an autoclave. At the same time, molten aluminium or aluminium alloy is fed into a crucible and then pressure in said autoclave is reduced to the level of $10^{-1}$ to $10^{-2}$ mmHg to discharge air in the carbon powder and molten metal gases. Thereafter, the carbon powder vessel is immersed in a metal bath, immediately followed by introduction of an inert gas such as nitrogen into the autoclave, the latter being then subjected to pressing under high pressure of more than 30 kg/cm² for several minutes. Said vessel is thereby fused and molten metal is penetrated into carbon powder, thus shaping a compressed mass. The thus impregnated shaped mass is then hoisted up out of the bath and allowed to stand for about one minute, and then, after returning pressure in the autoclave to normal pressure, the mass is removed from said autoclave and left in the air to allow spontaneous cooling. The impregnated shaped mass thus obtained is cleared, as by cutting, of the thin metal layer deposited on its surface and then worked into a desired size and configuration to obtain an apex seal member.

In the above-said series of operation, pulverized carbon used should be of size finer than 100 mesh Tyler standard, while the packing vessel may be one which is softened in the metal bath and destroyed or fused by molten metal, but preferably, such vessel should be made of sheet aluminium which does not cause change of the molten bath components. Molten bath, which is most preferred from the standpoint of shaping, is of an eutectic structure (for instance, AC8A alloy containing 11.0 to 13.0% by weight of Si — refer to H5202 of Japanese Industrial Standards) which does not cause dripping but is rapidly solidified when the impregnated mass is lifted up, but from the standpoint of structure, any molten bath of aluminium or an aluminium alloy may be used. The time duration for immersion should preferably be within 10 minutes, because too long immersion will invite excessive increase of the produced amount of aluminium carbide ($Al_4C_3$) to cause deterioration of water resistance of the produced apex seal member. Pressure for impregnation shaping may be suitably determined depending on the immersion time, but usually, best result can be obtained when such pressing operation is conducted under pressure of 50 kg/cm² for a duration of about 5 minutes.

In this case, packing density of carbon powder in the packing vessel will be within the range of 40 to 80% by volume (porosity 60 to 20%) and can hardly be below 40% or over 80%. Therefore, the metal content will be approximately 60 to 20% by volume. But, it is to be noted here that increase of the carbon content in the apex seal member may invite deterioration of impact resistance although it may improve wear resistance, while increase of the metal content will invite just the contrary phenomenon, so that it is advisable to adjust the carbon content such that it will stay within the range of about 60 to 65%. Particularly when it is desired to confine the carbon content in the produced apex seal member below 40% for the reason of quality of the casing with which said member is slided, it is recommendable to uniformly mix aluminium powder in carbon powder before it is packed in the packing vessel and to melt the mixture at the time of impregnation shaping.

EXAMPLE 1

Anthracite was calcinated at 1300°C for 5 hours to perfectly eliminate moisture and organic substances to thereby obtain carbon powder of 325 mesh through grain size. Obtained carbon powder was packed by tapping into a 8 × 15 × 70 m/m columnar vessel made of a 0.5 mm-thick aluminium plate so that packing density will be 65% by volume ratio, and then the feeding inlet was blocked with an aluminium plate. Then said carbon powder-packed vessel was placed in an externally heated type autoclave and pressure therein was reduced to $10^{-2}$ mmHg to expel air in the spaces between the pulverized carbon particles. Thereafter, said vessel was immersed in a molten bath of AC8A alloy at 650°C and subjected to compression with nitrogen gas under pressure of 70 kg/cm² for 5 minutes. The shaped mass was pulled up, cooled and machined to thereby give an apex seal member.

EXAMPLE 2

Pitch coke was calcinated at 1300°C for 5 hours to perfectly eliminate water and organic substances to obtain carbon powder of 325 mesh-through grain size. Obtained carbon powder was packed by tapping into a vessel similar to that used in Example 1 so that packing density will be 60% by volume ratio. The ensuing operation was conducted under the same conditions as in Example 1 to give an apex seal member.

EXAMPLE 3

Dry caking coal was pulverized to obtain 325 mesh-through carbon powder and the latter was packed by tapping into a 30 × 30 × 80 mm columnar vessel made of a 0.5 mm-thick aluminium plate so that packing density will be 65% by volume ratio, and then the feeding inlet was closed with an aluminium plate. Said carbon powder-packing vessel was then placed in an internally heated type autoclave and pressure therein was reduced to $10^{-1}$ mmHg to expel air in the spaces between the carbon particles. Thereafter, said vessel was immersed in a molten Al bath of 720°C and subjected to compression with nitrogen gas under pressue of 50 kg/cm² for 5 minutes. The shaped mass was hoisted up, cooled and machined to obtain an apex seal member.

EXAMPLE 4

Pitch coke of 100 mesh-through grain size was graft polymerized with polyacrylonitrile to obtain carbon powder, and this carbon powder was packed by tapping in a vessel similar to that used in Example 3 so that packing density will be 60% by volume ratio, and otherwise the same process as Example 3 was followed to obtain an apex seal member.

Figure 5:
FIG. 5 is a similar microphotograph showing the structure of a prior art article.

The apex seal members produced according to the processes of Examples 1 to 4, as evident in the microphotographs in FIGS. 1 to 4, had the structures where the individual carbon particles were bonded together with AC8A alloy or Al and where the carbon particles were uniformly dispersed in abundance in the aluminium or aluminium alloy base. When compared with the structure of a prior art apex seal member shown in FIG. 5 which was produced by impregnating a previously shaped carbon piece with about 20% (by volume) of AC8A under pressure of 80 kg/cm² for 5 minutes and where aluminium or an aluminium alloy is permeated in the spaces between the connected carbon particles, structural difference between the two will be evident. Formation of aluminium carbide around the carbon particles was confirmed by X-ray diffraction and X-ray microanalyzer scanning.

The properties of the products obtained in Examples 1, 2, 3 and 4 and that of the prior art are shown in the following table.

|  | No. of Example | | | | Prior art |
|---|---|---|---|---|---|
|  | 1 | 2 | 3 | 4 |  |
| Bulk specific gravity | 2.08 | 2.30 | 2.05 | 2.17 | 2.05 |
| Bending strength (kg/cm²) | 2200 | 2000 | 1800 | 1900 | 1400 |
| Coefficient of dynamical friction *1 | 0.10 | 0.08 | 0.10 | 0.08 | 0.10 |
| Wear resistibility (mm²) *2 | 0.09 | 0.18 | 0.09 | 0.10 | 0.10 |
| Wear resistibility (μ/hr) *3 | 0.8 | 1.5 | 0.5 | 1.5 | 2.5 |
| Pitting resistibility *4 | See photographs | | | | |

(Notes)

The tests for determining the properties marked with *1 to 4 in the above table were conducted in the following manners:

*1 This was determined by feeding lubricating oil of SAE No. 20 at frictional velocity of 30 m/sec on a rotating aluminum alloy-made disc whose surface was plated with hard chrome and finished into 0.3S.

*2 A 6 mm-wide, 8.5mm-high and 20 mm-l ng test piece having a substantially rectangle-shaped section with rounding of 4R in the center of the bottom end was prepared in otherwise the same conditions as in *1, and the bottom end thereof was pressed against the above-said rotating disc under load -continued

|  | No. of Example | | | | Prior art |
|---|---|---|---|---|---|
|  | 1 | 2 | 3 | 4 | | of 2.8 kg, and the amount of wear after the lapse of 800 minutes was determined.
*3 The apex seal members of Examples 1 and 2 and of the prior art were incorporated one each in the front piston of a known 2 and 2 lobe type NSU-Wankel type rotary piston engine (491 cc × 2 piston), while the apex seal members of Examples 3 and 4 and of the prior art were incorporated one each in the rear piston of said engine, and after 200-hour operation under full load at 7000 rpm while feeding SAE No. 30 lubricating oil by a metering pump at the rate of 200 cc/hr, wear loss at the ends of the respective apex seal members was determined.
*4 A total of 6 pieces of apex seal members were incorporated in the respective pistons in the same manner as said above, and the surface conditions after 200-hour operation under full load at 6000 rpm with no oil feeding from the metering pump were examined.

After the tests of *2 and *3, no abnormal abrasion was found on the inner face of the engine casing, and it was confirmed that both the products of the present invention and that of the prior art are effective in protecting abnormal abrasion on the inner face of the casing.

Figure 6:
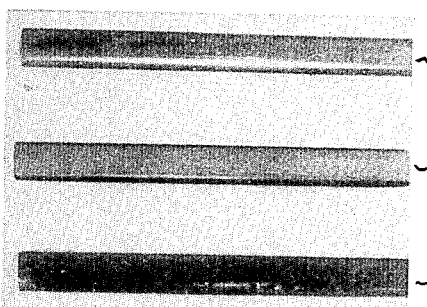
FIGS. 6 and 7 are the photographs showing the surface conditions of the apex seal members produced in the 1st to 4th Examples of the present invention and that of the prior art after the practical tests, said photographs being taken from top of the respective seal members.
Figure 7:
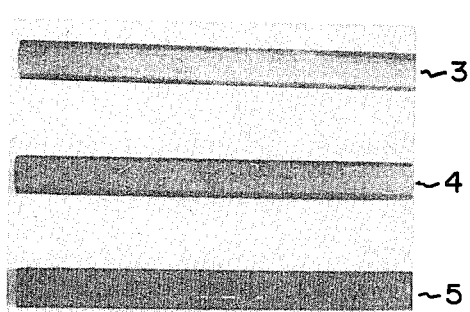

As apparent from the above table, the apex seal members according to the present invention show marked improvement in strength over the prior art articles. It is usually desirable that such apex seal member has a small specific gravity so as to minimize surface pressure of the member and has a small coefficient of friction from the standpoint of wear resistance. In this respect, the products of the present invention exhibit equally as good result as the prior art products. As regards wear resistance, the practical tests (*2) with feeding of libricating oil showed good result in both products, but in the practical tests (*3) with no feeding of lubricating oil, the products of the present invention suffered by far smaller wear loss than the prior art products. In a car engine, there is often produced a condition where lubricating oil runs low, so that it may be understood that the products of the present invention prove extremely useful when used as an apex seal member for a rotary piston engine. The results of the tests over pitting resistance are photographically illustrated in FIGS. 6 and 7, where reference numbers 1 to 4 represent the No. of Example, while reference number 5 represents the prior art product. As will be noticed from the photographs, the apex seal members according to the present invention remain perfectly free of pitting or flaking notwithstanding extremely rigorous conditions and can stand long-time use even under a condition where feeding of lubricating oil from metering pump is insufficient.

As particularized above, the wear-resistant sliding member such as apex seal according to the present invention has a structure in which the carbon particles are uniformly dispersed and bonded together with aluminium or aluminium alloy and also aluminium carbide is produced between these carbon particles and said metal, whereby various properties such as strength, wear resistance, pitting resistance and so forth are markedly improved. Further, the products of stabilized quality can be manufactured at a cost about half that of the conventional articles, and also the time required for manufacture is sizably shortened.

What we claim:

1. An apex seal member of a rotary piston engine having a continuous structure comprising a member selected from the group consisting of aluminum and an aluminum alloy and carbon particles, essentially uniformly distributed in said aluminum or aluminum alloy, said structure being prepared from a composition in which the amount of said carbon particles is by volume 40 to 80% of said member; and the size of the carbon particles is finer than 100 mesh Tyler standard and a layer of aluminum carbide formed in the interface between said aluminum or aluminum alloy and the surface of each of said carbon particles to securely bond said carbon particles thereto.

2. A structure for an apex seal member of rotary piston engine, as claimed in claim 1, wherein the amount of the carbon particles is 60 – 65% of the total volume.

3. A structure for an apex seal member of rotary piston engine, as claimed in claim 1, wherein said aluminum alloy consists essentially of 11.0–13.0% by weight of silicon, the balance being essentially aluminum.

* * * * *